(12) United States Patent
Yau (10) Patent No.: US 9,792,379 B2
(45) Date of Patent: *Oct. 17, 2017

(54) PLANE PUBLICATION PRODUCT SUPPORTING INTERACTIVE INTERCONNECTED SYSTEM

(71) Applicant: Yimwai Yau, Hong Kong (CN)

(72) Inventor: Yimwai Yau, Hong Kong (CN)

(73) Assignee: Yimwai YAU (HK)

( * ) Notice: Subject to any disclaimer, the term of this patent is extended or adjusted under 35 U.S.C. 154(b) by 0 days.

This patent is subject to a terminal disclaimer.

(21) Appl. No.: 14/772,779

(22) PCT Filed: Mar. 4, 2014

(86) PCT No.: PCT/CN2014/072863
§ 371 (c)(1),
(2) Date: Dec. 6, 2015

(87) PCT Pub. No.: WO2014/135071
PCT Pub. Date: Sep. 12, 2014

(65) Prior Publication Data
US 2016/0088145 A1    Mar. 24, 2016

(30) Foreign Application Priority Data

Mar. 4, 2013 (CN) ...................... 2013 2 0099660 U
Mar. 4, 2013 (CN) ...................... 2013 2 0099685 U
(Continued)

(51) Int. Cl.
H04N 21/435     (2011.01)
H04N 21/858     (2011.01)
G06F 17/30      (2006.01)

(52) U.S. Cl.
CPC .............................. *G06F 17/30876* (2013.01)

(58) Field of Classification Search
CPC ................................................. G06F 17/30876
See application file for complete search history.

(56) References Cited

U.S. PATENT DOCUMENTS

2005/0044179 A1* 2/2005 Hunter .............. G06F 17/30879
                                                    709/218
2011/0216179 A1* 9/2011 Dialameh ......... G06F 17/30247
                                                     348/62

(Continued)

*Primary Examiner* — Ajit Patel
(74) *Attorney, Agent, or Firm* — PROI Intellectual Property US (57) ABSTRACT

A plane publication product supports transmit-receive of a multimedia information signal of an interactive interconnected system comprising an electronic reading device and an electronic transmitter-receiver. A sheet surface of the plane publication product may be attached with an information content. The multimedia information signal is synthesized by media information data and associated data; the associated data is a preset Uniform Resource Identifier. The electronic transmitter-receiver is provided with an associated data reception circuit, an associated data transmission circuit and a central processing unit (with memory). The associated data reception circuit is equipped with a short-distance signal transmission-reception circuit; and the electronic transmitter-receiver is configured to control transmit-receive of the associated data of the decomposed multimedia information signal, receive the associated data decomposed by the transmission circuit of the electronic reading device, transmit the associated data to external via a remote wireless technology, and quickly call out an associated electronic file.

13 Claims, 7 Drawing Sheets

(30) Foreign Application Priority Data

Oct. 8, 2013 (CN) .................... 2013 2 0626464 U
Jan. 4, 2014 (CN) .................... 2014 2 0028436 U (56) References Cited

U.S. PATENT DOCUMENTS

2012/0256732 A1* 10/2012 McAllister ............ B65C 9/1865
340/10.2
2014/0263677 A1* 9/2014 Divringi ........... G06F 17/30879
235/494

* cited by examiner

PLANE PUBLICATION PRODUCT SUPPORTING INTERACTIVE INTERCONNECTED SYSTEM

CROSS REFERENCE TO RELATED APPLICATIONS

The present application is the US national stage of International Patent Application PCT/CN2014/072863 filed on Mar. 04, 2014, which, in turn, claims priority to Chinese Patent Applications CN 201320099685.0 filed on Mar. 04, 2013, CN 201320099660.0 filed on Mar. 04, 2013, CN 201320626464.4 filed on Oct. 08, 2013, and CN 201420028436.7 filed on Jan. 04, 2014.

TECHNICAL FIELD

The invention relates to an information association technology of a cross-media product, in particular to a plane publication product supporting an interactive interconnected system for achieving barrier-free development of information.

BACKGROUND ART

With the rapid development of a broadband wireless access technology and a mobile terminal technology, people have an urgent hope to be able to obtain information and service from Internet conveniently at will in a mobile process whenever and wherever possible.

However, mobile Internet is not mobilized Internet, but is a generic term of activities of combination and practice of technologies, platforms, commercial modes and applications of the Internet, and mobile communication technologies.

Mobile terminals will be more networked and socialized in future. How will the boring fragmented time of the people be made full use of? Such boring fragmented time is isolated and short. Since a mobile phone and other intelligent terminals are closest to the people, they can be considered as a constituent part of the people.

As the mobile phone becomes a mobile carrier in an information network, the mobile phone is not just a tool for making a call and sending short messages any longer, but is a miniature computer which can achieve ultimate combination of communication and the Internet to enable people to enter the era of mobile informatization really.

The mobile informatization is to realize comprehensive application of an information system on a handheld terminal such as the mobile phone in a manner of fusion of communication technologies such as telecommunications, broadcast and the Internet to achieve the purpose of obtaining relevant information whenever and wherever possible at will at last.

Although the transmission capacity of a traditional media advertisement product is lower than that of electronic media obviously, electronic media are not an "ultimate media form which can replace any one of the traditional print paper media, traditional broadcast, traditional television, traditional Internet and the like" praised highly by some people. How do Matters Stand?

The development of the electronic media still has serious defects and deficiencies. Due to the lack of relevant technical support for achieving cross-media information interaction association, so-called omnimedia is just to prepare the information content of the plane media into an electronic edition to be provided for a user to select.

With the development of a new generation broadcast technology based on DAB (Digital Audio Broadcasting), DVB (Digital Video Broadcasting), DMB (Digital Media Broadcasting) and the like, scientific and technical workers all over the world try hard to solve the relevant problems, for example Chinese invention patents 200310113194.8, 200610072903.6, 200580034624.4, 200620039633.4 and the like, which only effectively improve the transmission capacity of the information.

The smart phone shall log in the relevant electronic Internet of the cross-media product information to obtain richer relevant information epitaxially, the association technology is a non-spanning necessity, and the association technology and a transmission technology are two technical purposes of different concepts.

The existing association technology on the market is mainly a QR code pattern technical scheme. Although the QR code pattern technical scheme has become a mature product and industrial chain, there are many technical use condition limits in actual operation, as follows:

1. The smart phone can carry out capturing after downloading an appropriate application.
2. Definition of a QR code pattern.
3. Light during capturing of the QR code pattern.
4. Distance for capturing of the QR code pattern.
5. The QR code patterns are different in size (including 8 mm*8 mm, 10 mm*10 mm . . . 100 mm*100 mm, etc.), and the appearance attractiveness of an advertisement board is influenced with the QR code patterns.

If the QR code patterns are implanted into a screen frame and a webpage of a video product . . . during the actual operation, an electronic screen displays the QR code patterns for a very short time, and the user operation is difficult.

In addition, the QR code pattern technical scheme is powerless to achieve broadcast (an audio information technology) association with a multimedia information signal . . .

Therefore, a simpler and quicker interaction association technology with a high effect for randomly meeting the requirements anytime and anywhere is an urgent hope for the market.

The interactive interconnected system provided by the invention is a technology for achieving barrier-free transmission of the cross-media product information.

SUMMARY

In order to achieve the above purposes, the invention provides a plane publication product supporting an interactive interconnected system. The plane publication product supports transmit-receive of a multimedia information signal of the interactive interconnected system, and is characterized in that the interactive interconnected system comprises an electronic reading device and an electronic transmitter-receiver;

an information content can be attached to a sheet surface of the plane publication product;

the multimedia information signal is formed by media information data and associated data synthesis;

the associated data is a preset URI (Uniform Resource Identifier);

the electronic reading device is provided with a combination data reception circuit, a combination data decomposition circuit and a transmission circuit; the combination data reception circuit is configured to receive the multimedia information signal; the combination data decomposition circuit is configured to decompose the multimedia information signal into the media information data and the associated data; the decomposed associated data is transmitted to the electronic transmitter-receiver via the transmission circuit;

the electronic transmitter-receiver is provided with an associated data reception circuit, an associated data transmission circuit and a central processing unit (with memory);

the associated data reception circuit is equipped with a short-distance signal transmission-reception circuit; and the electronic transmitter-receiver is mainly configured to control transmit-receive of the associated data of the decomposed multimedia information signal, receive the associated data decomposed by the transmission circuit of the electronic reading device, transmit the associated data to an external information data storage center via a remote wireless technology, and quickly call out an associated electronic file.

An identification mark is attached to the information content of the sheet surface.

The electronic reading device is provided with the combination data reception circuit, the combination data decomposition circuit, the transmission circuit, and a CPU (Central Processing Unit) module board, which are embedded into the plane publication product supporting the interactive interconnected system; and the electronic transmitter-receiver is provided with an associated data reception circuit, an associated data transmission circuit and a central processing unit (with memory), which are embedded into a communication terminal product of the interactive interconnected system.

The combination data reception circuit, the combination data decomposition circuit, the transmission circuit and a CPU module of the electronic reading device, as well as the associated data reception circuit, the associated data transmission circuit and a central processing unit module (comprising the memory) of the electronic transmitter-receiver are embedded into the communication terminal product supporting the interactive interconnected system.

The electronic reading device is provided with the combination data reception circuit, the combination data decomposition circuit, the transmission circuit, and the CPU module board, which are placed in a data box supporting the interactive interconnected system.

The electronic transmitter-receiver is provided with an associated data reception circuit, an associated data transmission circuit and a central processing unit (with memory), which are embedded into a communication terminal product of the interactive interconnected system.

The transmission circuit of the electronic reading device is equipped with the short-distance signal transmission-reception circuit;

the combination data decomposition circuit of the electronic reading device is configured to decompose the multimedia information signal into the media information data that includes digital data, video data, audio data, program data, and the like;

the digital data after the decomposition of the media information data is transmitted to the related configuration for use after transmitted to a digital data system for processing;

The video data after decomposition of the media information data is transmitted to related configuration for use after transmitted to a video system for processing;

The audio data after the decomposition of the media information data is transmitted to the related configuration for use after transmitted to an audio system for processing;

the program data after the decomposition of the media information data is transmitted to the related configuration for use after transmitted to a program system for processing; and the decomposed associated data is transmitted by the transmission circuit and the equipped short-distance signal transmission-reception circuit.

An associated data module is attached to the electronic reading device.

An associated data module is attached to the electronic transmitter-receiver.

A plurality of guide directories are preset for the associated data module and are mainly configured to control different associated data combinations, and contents of the guide directories of the additional associated data module may be adjusted and changed.

The contents of the guide directories of the additional associated data module are changed automatically with set time.

The invention provides a plane publication product supporting an interactive interconnected system, which realizes the interaction association of cross-media information products and achieves the goal of barrier-free information:

1. The plane publication product may acquire the relevant associated data from the multimedia information signal supporting the interactive interconnected system, and the related associated data is transmitted synchronously as a quick entry point of an electronic webpage to meet random technical requirements of the mobile informatization anytime and anywhere.

2. Due to the technical combination characteristic of the interactive interconnected system, original functions of the product are not changed, and combined functions can support mutually to achieve an obvious technical effect, the barrier-free association of the cross-media product information is achieved by the simplest point-to-point association technology, and the interaction association capacity of the interactive interconnected system is obviously better than that of the existing QR code and other association technology solutions on the market.

The invention has the particular contribution that the associated data can be transmitted by taking various approaches, so that the invention solves the technical problem of information congestion in the mobile informatization development effectively, and assists in improving the existing traffic light facility by using the existing social resources of advertisement boards in bus shelters, and the visually impaired people obtain help of voice guide and relevant traffic information service via the communication terminal product (such as a smart phone) supporting the interactive interconnected system.

DETAILED DESCRIPTION OF PREFERRED EMBODIMENTS

Figures 1A, 1B:
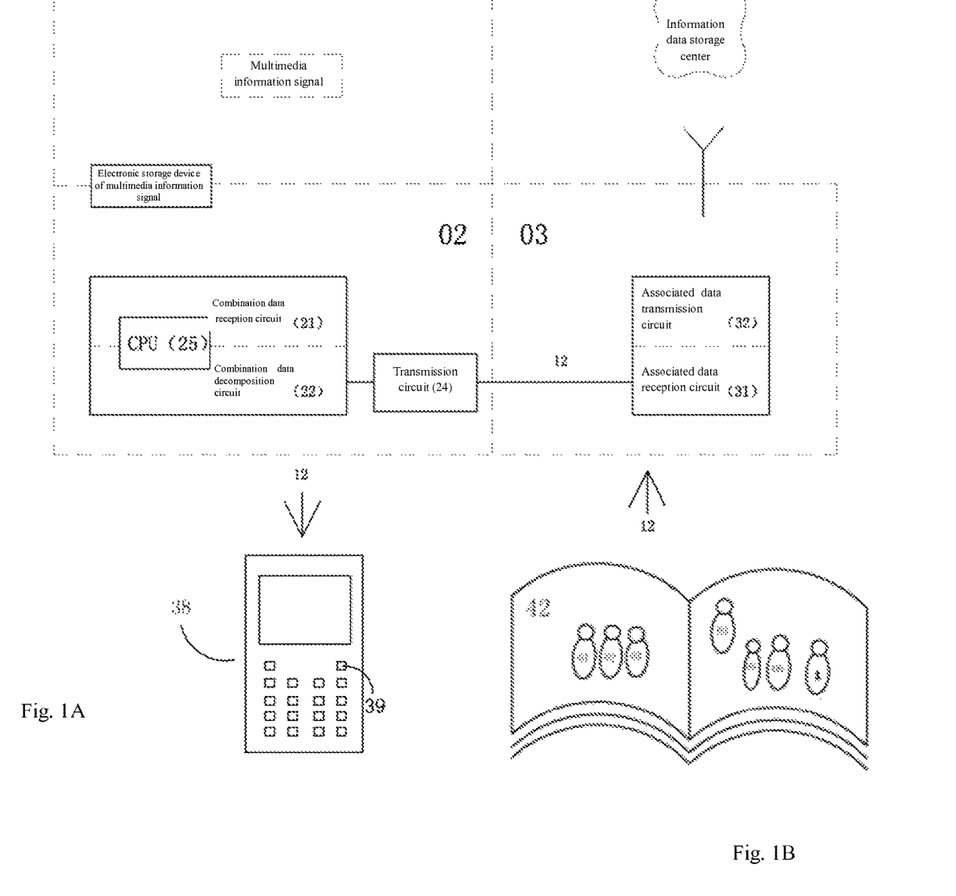
FIG. 1A is an operation diagram of a plane publication product to obtain single associated data.
FIG. 1B is a principle diagram of a plane publication product to obtain single associated data.

The following embodiments further explain and describe the invention, and do not constitute any limit to the invention;

The invention provides a plane publication product supporting an interactive interconnected system. The plane publication product supports transmit-receive of a multimedia information signal of the interactive interconnected system, and is characterized in that the interactive interconnected system comprises an electronic reading device 02 and an electronic transmitter-receiver 03;

an information content can be attached to a sheet surface of the plane publication product;

the multimedia information signal is formed by media information data and associated data 12 synthesis;

the associated data is a preset URI (Uniform Resource Identifier);

as shown in FIG. 1A, the electronic reading device is provided with a combination data reception circuit 21, a combination data decomposition circuit 22 and a transmission circuit 24; the combination data reception circuit is configured to receive the multimedia information signal; the combination data decomposition circuit 22 is configured to decompose the multimedia information signal into the media information data and the associated data; the decomposed associated data is transmitted to the electronic transmitter-receiver via the transmission circuit 24;

the electronic transmitter-receiver is provided with an associated data reception circuit 31, an associated data transmission circuit 32 and a central processing unit (with memory);

the associated data reception circuit 31 is equipped with a short-distance signal transmission-reception circuit;

the short-distance communication technology includes NFC and Bluetooth technology, etc.; and the electronic transmitter-receiver is mainly configured to control transmit-receive of the associated data of the decomposed multimedia information signal, receive the associated data decomposed by the transmission circuit of the electronic reading device, transmit the associated data to an external information data storage center via a remote wireless technology, and quickly call out an associated electronic file.

The remote communication technology includes GSM (Global System for Mobile), CDMA (Code Division Multiple Access), GPRS (General Packet Radio Service) and other technologies.

The external information data storage center may be a memory of a related product, Internet, cloud storage and the like, or a built-in memory of the electronic reading device.

The called electronic file is viewed by a visual electronic screen product, including an electronic terminal product, a communication terminal product, a computer, a print media product and the like supporting an interaction association technology.

As shown in FIG. 1B, one single information content is shown, only one single associated data (namely a single URI (Uniform Resource Identifier)) is required to be set for the information content, and multiple replication and cyclic transmission are set for the associated data within reading time of a media information content.

The plane publication product is a single-sheet product or a product synthesized by a plurality of sheets, and an identification mark is attached to the information content of the sheet surface.

A corresponding electronic code is set for the identification mark. In order to facilitate operations, the identification mark is set by a simplest figure, or a symbol or a character.

Figures 1C, 1D:
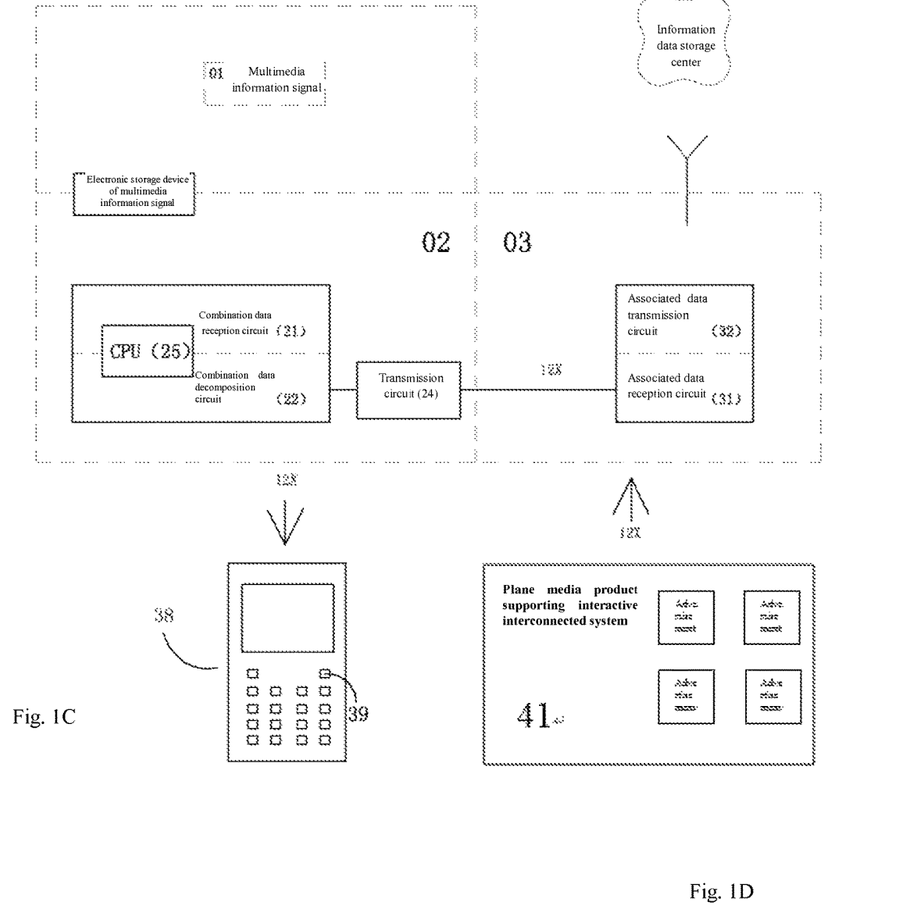
FIG. 1C is an operation diagram of a plane publication product to obtain multiple associated data.
FIG. 1D is a principle diagram of a plane publication product to obtain multiple associated data.

As shown in FIG. 1C,

The associated data is an associated data group 12X as a combination of more than one associated data, and the different URIs (Uniform Resource Identifiers) are set for the different associated data respectively.

As shown in FIG. 1D, six information contents are shown, and correspond to the six associated data (namely the six URIs (Uniform Resource Identifiers)), and the different URIs (Uniform Resource Identifiers) are associated with different electronic files . . .

The URI (Uniform Resource Identifier) T01 corresponds to the information content 01 . . .

The URI (Uniform Resource Identifier) TX corresponds to the information content X . . .

The multiple replication and cyclic transmission are set for the different associated data within the reading time of the six different media information contents.

The associated data sets an electronic reading code 14, the different electronic reading codes correspond to the different associated data, and the different URIs (Uniform Resource Identifiers) are set for the different associated data respectively.

The existing technical scheme on the market is as follows.

The information content of the plane publication product (such as a paper publication) is a planar information technology, and a transmission effect of the plane publication product is much lower than that of electronic media.

In order to improve the transmission effect of the plane publication product, there're various technical solutions on the market. One technical solution is a QR code technical solution. Relevant application examples are as follows.

Figure 3A:
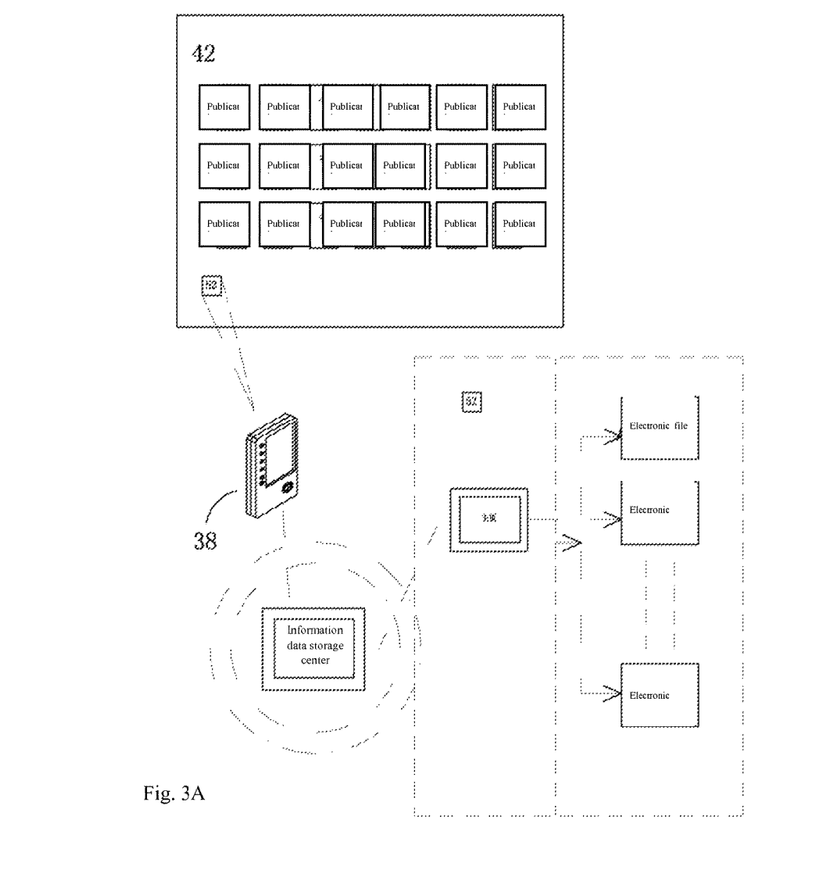
FIG. 3A is a design sketch of a traditional print magazine adopting a QR code pattern technology.

As shown in FIG. 3A, a single QR code pattern (the planar information technology) is implanted into Print Weekly 42, and the information content concerned by a reader is provided for the reader to see;

1. The QR code pattern is captured by the smart phone and processed and converted into the URI (Uniform Resource Identifier) . . .

2. Access to the website of the relevant URI (Uniform Resource Identifier) . . .

3. The traditional webpage search operation is carried out . . .

It shall be especially emphasized that the operation will be very complicated if the QR code patterns attached to the Print Weekly are not associated with the information from the same Internet website.

The relevant embodiments of the invention are as follows.

First Mode:

The electronic reading device is provided with the combination data reception circuit, the combination data decomposition circuit, the transmission circuit, and a CPU (Central Processing Unit) module board, which are embedded into the plane publication product supporting the interactive interconnected system; and the electronic transmitter-receiver is provided with an associated data reception circuit, an associated data transmission circuit and a central processing unit (with memory), which are embedded into a communication terminal product of the interactive interconnected system.

Due to the technical combination characteristic of the interactive interconnected system, original functions of the product are not changed, and combined functions can support mutually to achieve an obvious technical effect, and the barrier-free information connection of the cross-media product is achieved by the simplest point-to-point association technology.

There are two operating methods for obtaining the associated data basically:

first method: on the smart phone (within an effective range), an association operation key 39 is pressed at will (to start the interactive interconnected system), and then the association operation key 39 is pressed again, so that the electronic transmitter-receiver can obtain the selected associated data (namely the URI (Uniform Resource Identifier)) from the electronic reading device;

second method: on the smart phone (within an effective range), the association operation key 39 is pressed at will (to start the interactive interconnected system), and then a corresponding figure (the electronic reading code) according to a figure implanted into the information content (a planar identification mark) is input, so that the electronic transmitter-receiver can obtain the selected associated data (namely the URI (Uniform Resource Identifier)) from the electronic reading device . . .

Another use method is as follows: the user presses an enter key after accomplishing relevant steps of the first method or the second method, and the electronic transmitter-receiver can obtain the selected associated data from the electronic reading device for storage.

Afterwards, the set associated electronic file can be called out quickly anytime, and the associated data can be transmitted to the data storage center via the transmission circuit to quickly call out the set associated electronic file for viewing (or listening) on the smart phone.

Second Mode:

The combination data reception circuit, the combination data decomposition circuit, the transmission circuit and a CPU module of the electronic reading device, as well as the associated data reception circuit, the associated data transmission circuit and a central processing unit module (comprising the memory) of the electronic transmitter-receiver are embedded into the communication terminal product supporting the interactive interconnected system.

Figure 2A:
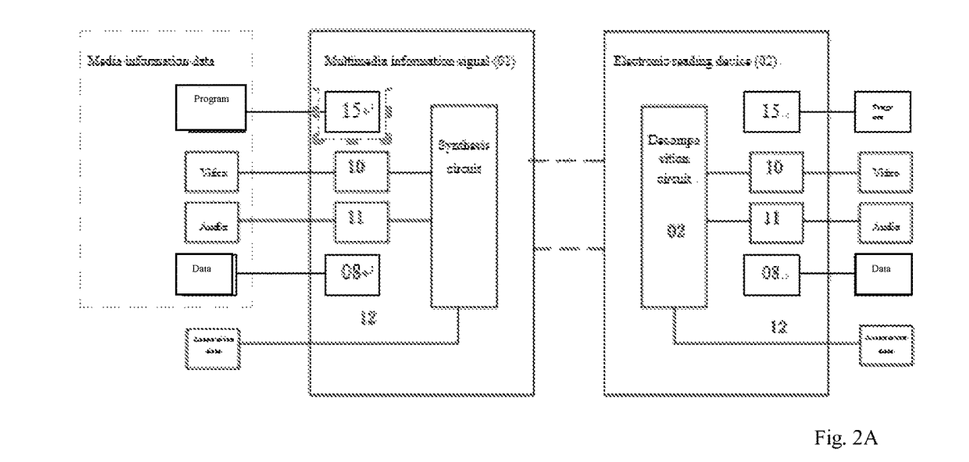
FIG. 2A is a principle diagram of a multimedia information signal supporting an interactive interconnected system.
Figure 2B:
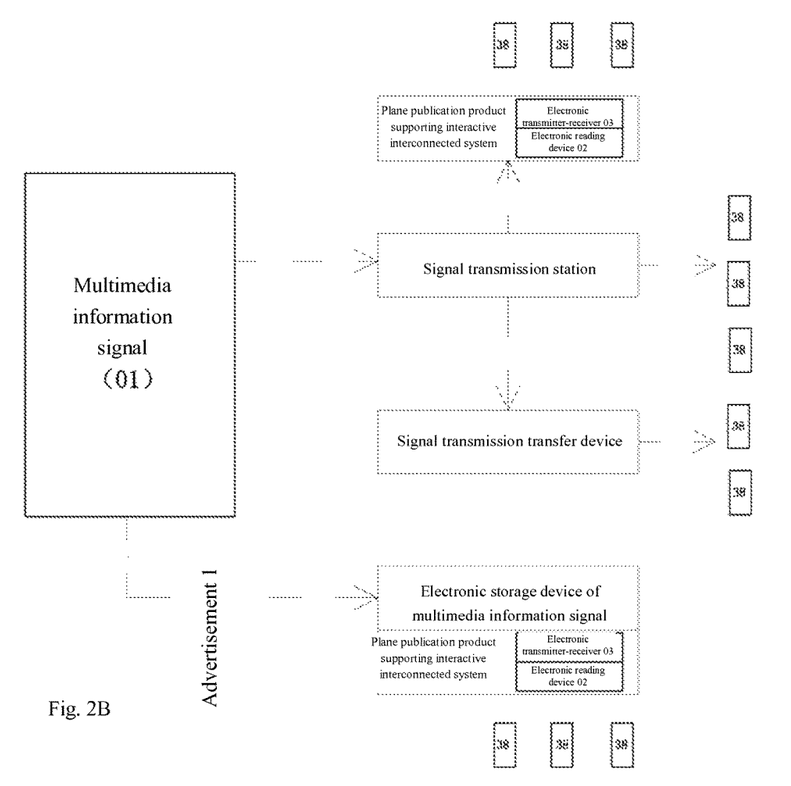
FIG. 2B is a schematic diagram of a technical application of an interactive interconnected system.

As shown in FIGS. 1A, 1C and 2B, the user receives the associated data from the plane publication product supporting the interactive interconnected system via the communication terminal product (such as the smart phone) under the guidance of the media information content of the plane publication product, and then transmits the associated data synchronously to achieve a point-to-point effect.

It shall be especially emphasized that the mode can provide great convenience for the visually impaired people to read.

Third Mode:

The electronic reading device is provided with the combination data reception circuit, the combination data decomposition circuit, the transmission circuit, and the CPU module board, which are placed in a data box 43 supporting the interactive interconnected system to facilitate carrying and use; and the electronic transmitter-receiver is provided with an associated data reception circuit, an associated data transmission circuit and a central processing unit (with memory), which are embedded into a communication terminal product of the interactive interconnected system.

The transmission circuit of the electronic reading device is equipped with the short-distance signal transmission-reception circuit;

the combination data decomposition circuit of the electronic reading device is configured to decompose the multimedia information signal into the media information data that includes digital data 08, video data 10, audio data 11, program data 15, and the like;

the digital data after the decomposition of the media information data is transmitted to the related configuration for use after transmitted to a digital data system for processing;

The video data after decomposition of the media information data is transmitted to related configuration for use after transmitted to a video system for processing;

The audio data after the decomposition of the media information data is transmitted to the related configuration for use after transmitted to an audio system for processing; and the program data after the decomposition of the media information data is transmitted to the related configuration for use after transmitted to a program system for processing; and the decomposed associated data is transmitted by the transmission circuit and the equipped short-distance signal transmission-reception circuit.

The electronic transmitter-receiver is provided with the association operation key 39, and a signal induction device 36 supporting the interactive interconnected system.

The multiple replication and cyclic transmission are set for the associated data within the reading time of the media information data, the user is only required to press the association operation key 39, and the electronic transmitter-receiver is configured to receive the associated data decomposed by the transmission circuit of the electronic reading device, transmit the associated data to the external information data storage center via the remote wireless technology, and quickly call out the associated electronic file associated with the information data storage center.

Since many information signals exist in an atmosphere, the communication terminal product supporting the interactive interconnected system is provided with the signal induction device 36 (including light, sound and the like) to remind the user that the relevant associated data of the interactive interconnected system can be provided for a position range where the user is located . . . which particularly meets the requirements of the visually impaired people.

Embodiment 1

Figure 3B:
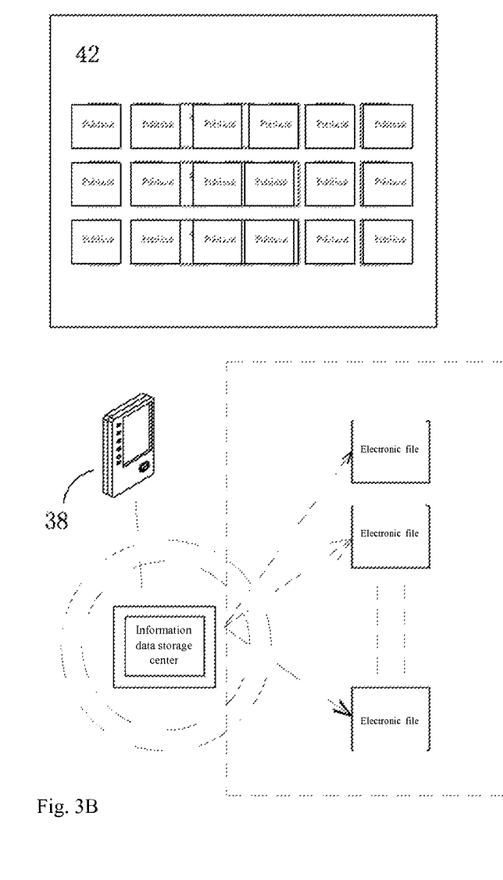
FIG. 3B is a design sketch of a traditional print magazine adopting a technology of the invention.

As shown in FIG. 3B, the communication terminal product 38 (the smart phone) is matched with the plane publication product for use, and the associated data can be obtained very easily with the first or second method . . . Obviously, the visually impaired people can carry out operations and use.

Since there're various publications on the market, which is a technical problem not effectively solved by the omnimedia developing up to now, the planar information technology and an electronic information technology are two different information technologies.

An associated data module is attached to the electronic reading device.

An associated data module is attached to the electronic transmitter-receiver.

A plurality of guide directories are preset for the associated data module and are mainly configured to control different associated data combinations, and contents of the guide directories of the additional associated data module may be adjusted and changed.

Embodiment 2

Figure 4A:
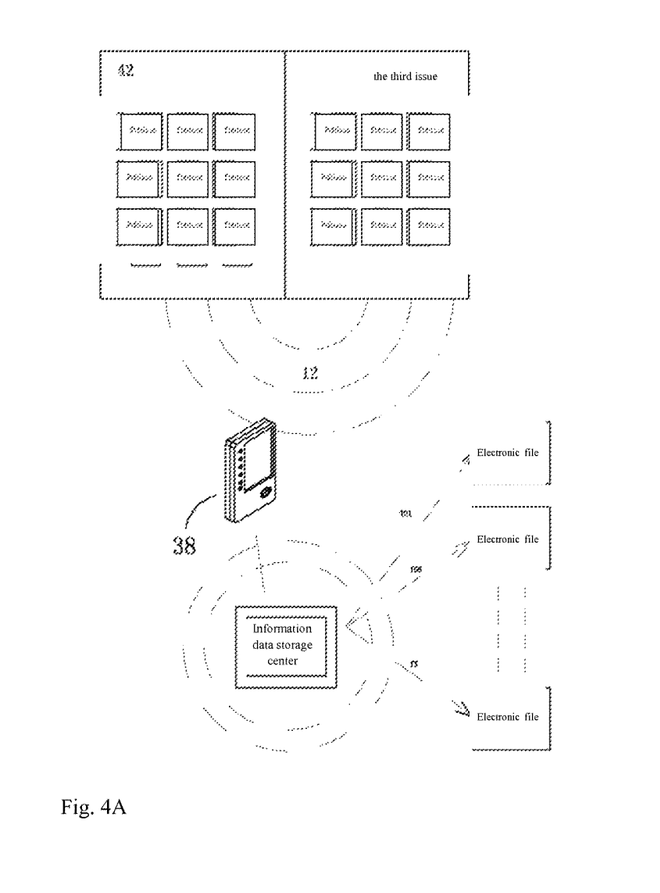
FIG. 4A is an operation diagram 1 of Reader's Weekly adopting a technology of the invention.

As shown in FIG. 4A, the guide directory 01 is set for the third issue of Reader's Weekly 41; a reader presses down the association operation key 39 (to start the interactive interconnected system) via a smart phone, and then inputs a corresponding figure (the electronic reading code) according to a figure (the identification mark) attached to the information content of the third issue, and the electronic transmitter-receiver embedded into the smart phone can obtain the selected associated data (namely the URI (Uniform Resource Identifier)) from the electronic reading device . . . The associated data is the electronic file corresponding to the content of the third issue . . . .

Figure 4B:
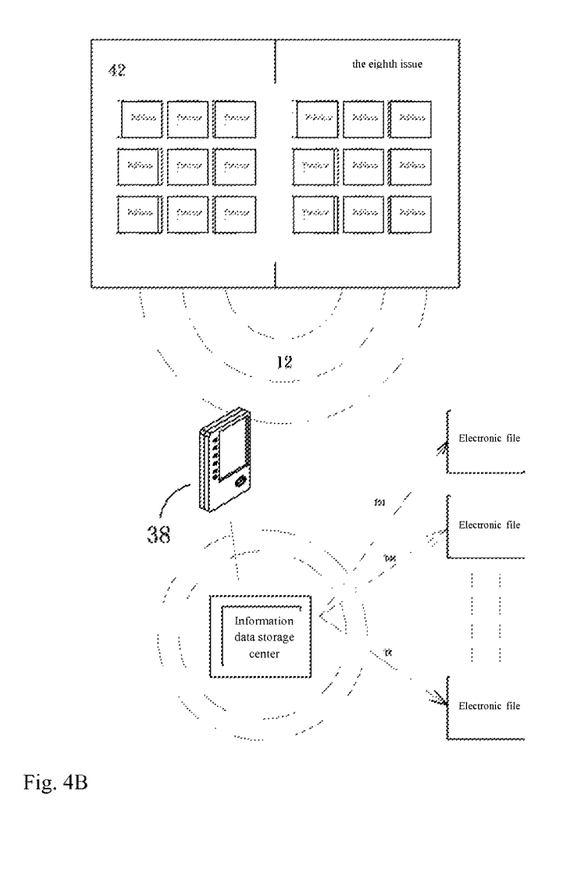
FIG. 4B is an operation diagram 2 of Reader's Weekly adopting a technology of the invention.

As shown in FIG. 4B, the guide directory 01 is set for the eighth issue of the Reader's Weekly 41; a reader presses down the association operation key 39 (to start the interactive interconnected system) via a smart phone, and then inputs a corresponding figure (the electronic reading code) according to a figure (the identification mark) attached to the information content of the eighth issue, and the electronic transmitter-receiver embedded into the smart phone can obtain the selected associated data (namely the URI (Uniform Resource Identifier)) from the electronic reading device . . . The associated data is the electronic file corresponding to the content of the eighth issue . . . .

Though the figures (the identification marks) are the same, the readers obtains the set electronic file corresponding to the issue of the Reader's Weekly based on master control of the different guide directories.

Figure 5A:
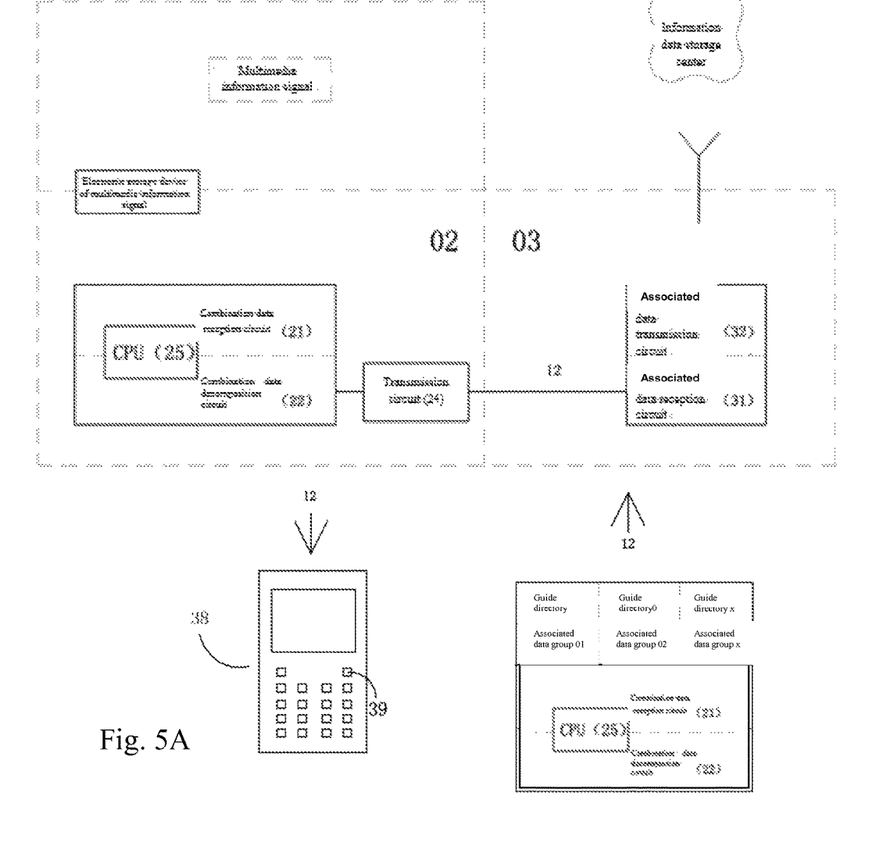
FIG. 5A is an application diagram of a guide directory of the invention.
Figure 5B:
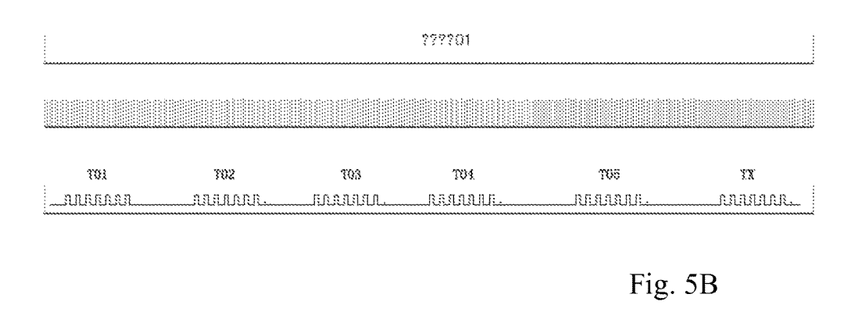
FIG. 5B is a principle diagram of a guide directory of the invention.

As shown in FIGS. 5A and 5B,

In order to facilitate the use of the reader, an automatic change condition may be preset, that is to say, the automatic change condition is set according to the requirements of the different plane publication products;

for example, the guide directories may be designed as daily automatic change, weekly automatic change, or monthly automatic change . . . .

A plurality of guide directories are preset for the associated data module and are mainly configured to control different associated data combinations, and contents of the guide directories of the additional associated data module may be adjusted and changed.

The contents of the guide directories of the additional associated data module are changed automatically with set time.

Embodiment 3

Figure 5C:
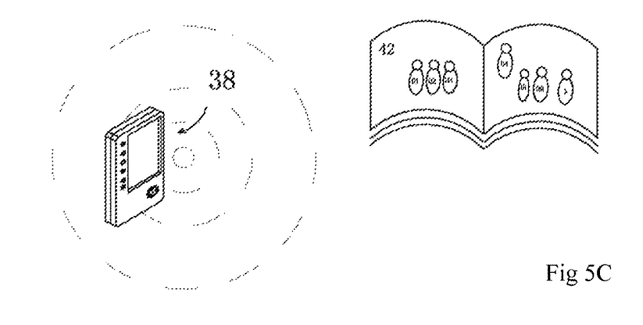
FIG. 5C is an application diagram 1 of the invention.

As shown in FIG. 5C, the smart phone obtains the associated data of the relevant media information signal via a Textbook of a plane publication.

Figure 5D:
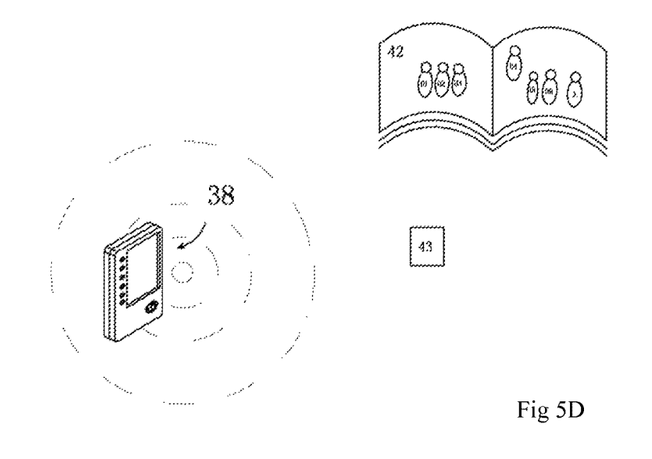
FIG. 5D is an application diagram 2 of the invention.

As shown in FIG. 5D, the smart phone obtains the associated data of the relevant media information signal via the data box 43 supporting the interactive interconnected system.

Figure 5E:
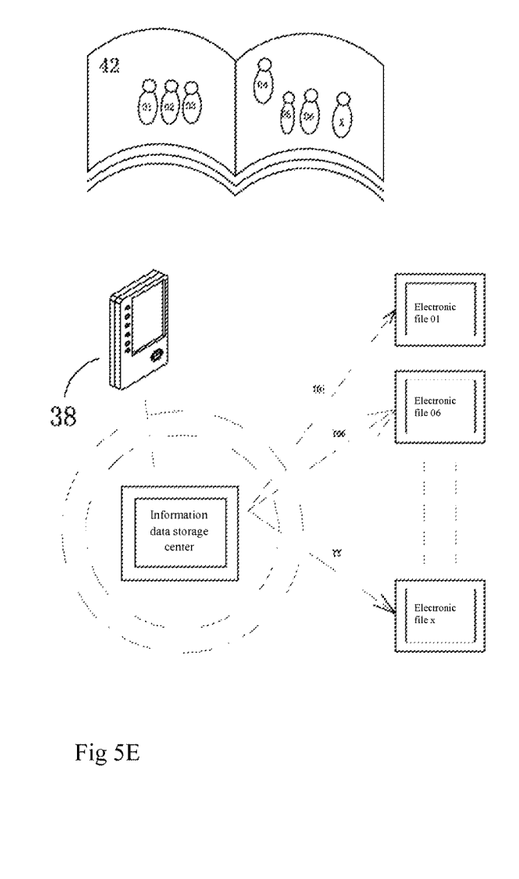
FIG. 5E is an application diagram 3 of the invention.

As shown in FIG. 5E, the smart phone obtains the associated data of the relevant media information signal via the built-in associated data module.

the association address data is association hybrid data 12M capable of being mixed with content data such as characters, images, audio and video, the association hybrid data 12M is decomposed into the associated data by an association hybrid data decomposition circuit, and the user can carry out selective operation according to the requirements via guide information such as the relevant characters, images, audio and video displayed on an electronic display screen of the electronic transmitter-receiver.

When the invention is compared with the operation of obtaining the associated data via the QR code patterns;

1. The interactive interconnected system shall be embedded into the smart phone for support, which is the same as the QR code patterns.

2. Obtaining of the associated data is much more sensitive and accurate than capturing of the QR code patterns.

3. The associated data can be obtained without influence of light conditions.

4. The distance for obtaining the associated data may be set within a range of tens of meters as required, and the invention is very stable, while the QR code pattern technical scheme has an operationable range of about 1 m under the normal condition.

5. The figures are used for replacing the QR code patterns, which can reduce the influence on the appearance attractiveness of the advertisement boards.

By reference to the effects of the above relevant embodiments, through the comparison between the invention and the relevant technical solutions and product schemes on the market, the invention is obviously superior to the others in use, operation, manufacturing cost and transmission effect, and the development of the invention will influence all links of a commercial chain, and create a brand-new commercial mode and value chain.

Although the invention is revealed through the above embodiments, the range of the invention is not limited to those, and the above members may be replaced by similar or identical elements realized by those skilled in the art under the condition of not deviating from the conception of the invention.

What is claimed is:

1. A paper publication product supporting an interactive interconnected system, wherein the paper publication product (42) is configured to support transmit-receive of a multimedia information signal (01) of the interactive interconnected system, wherein the interactive interconnected system comprises an electronic reading device (02) and an electronic transmitter-receiver (03);

an information content can be attached to a sheet surface of the paper publication product;

the multimedia information signal is synthesized by media information data and associated data (12);

the associated data is a preset URI (Uniform Resource Identifier);

the electronic reading device is provided with a combination data reception circuit (21), a combination data decomposition circuit (22), an associated data module, and a transmission circuit (24); the combination data reception circuit is configured to receive the multimedia information signal; the combination data decomposition circuit (22) is configured to decompose the multimedia information signal into the media information data and the associated data; the decomposed associated data is transmitted to the electronic transmitter-receiver via the transmission circuit (24);

the electronic transmitter-receiver is provided with an associated data reception circuit (31), an associated data transmission circuit (32) and a central processing unit comprising a memory;

the associated data reception circuit (31) is equipped with a short-distance signal transmission-reception circuit; and the electronic transmitter-receiver is mainly configured to control transmit-receive of the associated data of the decomposed multimedia information signal, receive the associated data decomposed by the transmission circuit of the electronic reading device, transmit the associated data to an external information data storage center via a remote wireless technology, and quickly call out an associated electronic file.

2. The paper publication product of claim 1, wherein an identification mark is attached to the information content of the sheet surface.

3. The paper publication product of claim 1, wherein the electronic reading device is provided with the combination data reception circuit, the combination data decomposition circuit, the transmission circuit, and a CPU (Central Processing Unit) module board, which are embedded into the paper publication product supporting the interactive interconnected system; and the electronic transmitter-receiver is provided with an associated data reception circuit, an associated data transmission circuit and a central processing unit (with memory), which are embedded into a communication terminal product of the interactive interconnected system.

4. The paper publication product of claim 1, wherein the combination data reception circuit, the combination data decomposition circuit, the transmission circuit and a CPU module of the electronic reading device, as well as the associated data reception circuit, the associated data transmission circuit and a central processing unit module (comprising the memory) of the electronic transmitter-receiver are embedded into the communication terminal product supporting the interactive interconnected system.

5. The paper publication product of claim 1, wherein the electronic reading device is provided with the combination data reception circuit, the combination data decomposition circuit, the transmission circuit, and the CPU module board, which are placed in a data box (43) supporting the interactive interconnected system;

the electronic transmitter-receiver is provided with an associated data reception circuit, an associated data transmission circuit and a central processing unit (with memory), which are embedded into a communication terminal product of the interactive interconnected system.

6. The paper publication product of claim 1, wherein the transmission circuit of the electronic reading device is equipped with the short-distance signal transmission-reception circuit;

the combination data decomposition circuit of the electronic reading device is configured to decompose the multimedia information signal into the media information data that includes digital data (08), video data (10), audio data (11), program data (15);

the digital data after the decomposition of the media information data is transmitted to the related configuration for use after transmitted to a digital data system for processing;

the video data after decomposition of the media information data is transmitted to related configuration for use after transmitted to a video system for processing;

the audio data after the decomposition of the media information data is transmitted to the related configuration for use after transmitted to an audio system for processing; and the program data after the decomposition of the media information data is transmitted to the related configuration for use after transmitted to a program system for processing; and the decomposed associated data is transmitted by the transmission circuit and the equipped short-distance signal transmission-reception circuit.

7. The paper publication product of claim 1, wherein the associated data module is attached to the electronic reading device.

8. The paper publication product of claim 1, wherein an associated data module is attached to the electronic transmitter-receiver.

9. The paper publication product of claim 7, wherein a plurality of guide directories are preset for the associated data module and are mainly configured to control different associated data combinations, and contents of the guide directories of the additional associated data module may be adjusted and changed.

10. The paper publication product of claim 9, wherein the contents of the guide directories of the additional associated data module are changed automatically with set time.

11. The paper publication product of claim 8, wherein a plurality of guide directories are preset for the associated data module and are mainly configured to control different associated data combinations, and contents of the guide directories of the additional associated data module may be adjusted and changed.

12. The paper publication product of claim 11, wherein the contents of the guide directories of the additional associated data module are changed automatically with set time.

13. The paper publication product of claim 1, wherein the paper publication product is made of non-electronic media materials and is a single-sheet product or a product synthesized by a plurality of sheets, with an identification mark is attached to the information content of the sheet surface.

* * * * *